United States Patent [19]

Nakagawa et al.

[11] Patent Number: 4,558,357
[45] Date of Patent: Dec. 10, 1985

[54] COLOR IMAGE READING METHOD AND APPARATUS

[75] Inventors: Katsumi Nakagawa, Tokyo; Noritaka Mochizuki, Yokohama; Toshiyuki Komatsu, Yokohama; Masaki Fukaya, Yokohama; Mitsutoshi Kuno, Kawasaki, all of Japan

[73] Assignee: Canon Kabushiki Kaisha, Tokyo, Japan

[21] Appl. No.: 505,270

[22] Filed: Jun. 17, 1983

[30] Foreign Application Priority Data

Jun. 23, 1982 [JP] Japan ................. 57-107879

[51] Int. Cl.$^4$ ............................................. H04N 1/46
[52] U.S. Cl. ........................................................ 358/75
[58] Field of Search ..................................... 358/75–80

[56] References Cited

U.S. PATENT DOCUMENTS

| 4,366,500 | 12/1982 | Kurtz | 358/75 |
| 4,375,647 | 3/1983 | Mir | 358/75 |
| 4,413,276 | 11/1983 | Hertz | 358/75 |

FOREIGN PATENT DOCUMENTS

| 102614 | 8/1977 | Japan . | |
| 57-170666 | 10/1982 | Japan | 358/75 |
| 58-137361 | 8/1983 | Japan | 358/75 |

Primary Examiner—Michael A. Masinick
Attorney, Agent, or Firm—Fitzpatrick, Cella, Harper & Scinto

[57] ABSTRACT

A color image reading method and apparatus in which the image of an object is formed by a single imaging optical system and a plurality of image pickup elements corresponding to lights of different wavelength ranges are disposed at imaging positions whereat the resolution of the imaging optical system is maximum in the respective corresponding wavelength ranges, whereby the image is read.

5 Claims, 11 Drawing Figures

COLOR IMAGE READING METHOD AND APPARATUS

BACKGROUND OF THE INVENTION

1. Field of the Invention

This invention relates to a color image reading method and apparatus in which the image of an object is read as image information having color information by image pickup means comprising a CCD (charge coupled device).

2. Description of the Prior Art

In recent years, various types of image transmitting or processing apparatus have been popularized along with the development of the electronic technique. In such type of apparatus, a portion for converting the image of an object into electrical signals, i.e., an image reading apparatus, is indispensable. In such an image reading apparatus, as typically seen in many types of apparatus including facsimile, use is widely made of a method in which a so-called line sensor comprising a plurality of picture elements arranged in the form of a row is used and this line sensor is moved in a direction substantially orthogonal to the direction of the row relative to the image of an object formed by an imaging optical system (minor scanning) while the line sensor is major-scanned, whereby the image is read.

Now, for the image reading apparatus, it is desired that the reading time be as short as possible and the energy required for illuminating the object be small. For this purpose, the imaging optical system used must be as bright as possible. Also, as viewed from the viewpoint of demand, the color reading function will be required of image sensors in the future.

As a color image reading apparatus, there is known one in which a plurality of rows of line sensors corresponding to lights of different wavelength ranges are provided on the imaging plane of an object, as shown, for example, in Japanese Laid-open patent application No. 102614/1977.

However, the color image reading apparatus according to the prior art has suffered from a problem that in the imaging optical system as described above, there is a tendency that the imaging position is often varied by the wavelength of light.

FIG. 1 of the accompanying drawings is a schematic view for illustrating the conventional reading method in a case where an array of light-converging fiber (tradename: SELFOC; produced and sold by Nippon Sheet Glass Co., Ltd.) is used in the imaging optical system. The light-converging fiber array 101 causes the image of an original 102 to be formed at a position 103. The then distance between the original 102 and the image 103 thereof is L. It is also to be understood that the distance between one end of the light-converging fiber array 101 and the original 102 is equal to the distance between the other end of the light-converging fiber array 101 and the image 103.

The result of MTF (modulation transfer function) relative to the spatial frequency of the original examined at the position of the image 103 in FIG. 1 is shown in FIGS. 2 and 3 of the accompanying drawings.

In FIG. 2, reference numeral 201 shows the result measured by red light having a central wavelength $\lambda = 0.620$ $\mu$m and with L = 20 mm, reference numeral 202 shows the result measured by green light having a central wavelength $\lambda = 0.535$ $\mu$m and with L = 18 mm, and reference numeral 203 shows the result measured by blue light having a central wavelength $\lambda = 0.445$ $\mu$m and with L = 16 mm, and in each case, MTF has been good.

In FIG. 3, L = 18 mm for all of the lights of various wavelength ranges in FIG. 2. In FIG. 3, MTF 302 for green light is good, while MTF 301 for red light and MTF 303 for blue light are extremely reduced. This is because L = 18 mm is not appropriate for red light and blue light.

Accordingly, if an image sensor is provided at the imaging position for light of a particular wavelength (e.g. green light), the resolution is remarkably reduced for lights of other wavelengths (e.g. red light and blue light).

To prevent this, an achromatic lens may be employed in the imaging optical system, but such a lens is expensive. The light-converging fiber array as previously described cannot be used. An alternative method using a discrete imaging optical system for light of each wavelength range is liable to lead to a complicated and bulky construction. These problems have formed great impediments in realizing a compact and inexpensive color image reading apparatus of high resolution.

SUMMARY OF THE INVENTION

It is an object of the present invention to provide a color image reading method and apparatus which are capable of color reading of high resolution by the use of an inexpensive imaging optical system.

It is another object of the present invention to provide a color image reading method and apparatus which are compact in construction and capable of color reading of high resolution.

These objects are achieved by a color image reading method and apparatus in which the image of an object is formed by a single imaging optical system and a plurality of image pickup means corresponding to lights of different wavelength ranges are disposed at imaging positions whereat the resolution of the imaging optical system is maximum in the respective corresponding wavelength ranges, whereby the image is read.

The invention will become more fully apparent from the following detailed description thereof taken in conjunction with the accompanying drawings.

DETAILED DESCRIPTION OF THE PREFERRED EMBODIMENTS

Figure 1:
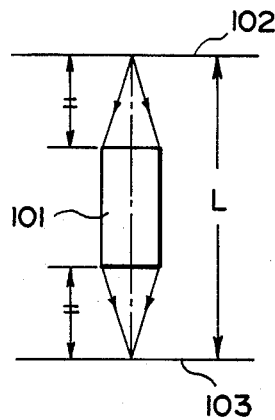
FIG. 1 is a schematic view for illustrating the color image reading method according to the prior art.
Figure 2:
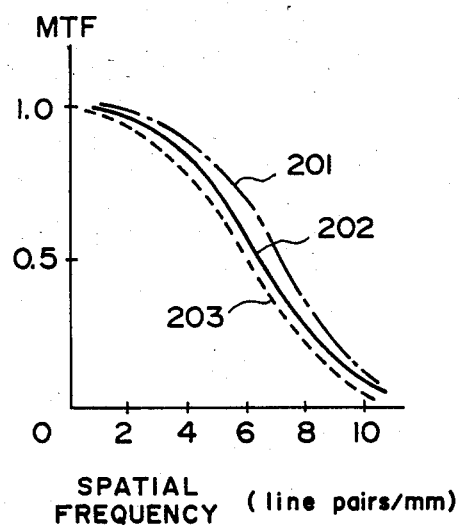
FIGS. 2 and 3 show the result of MTF for the spatial frequency of an original in the reading method according to the prior art.
Figure 3:
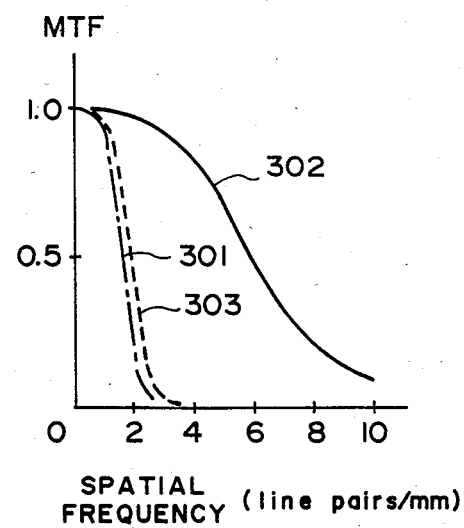
Figure 4:
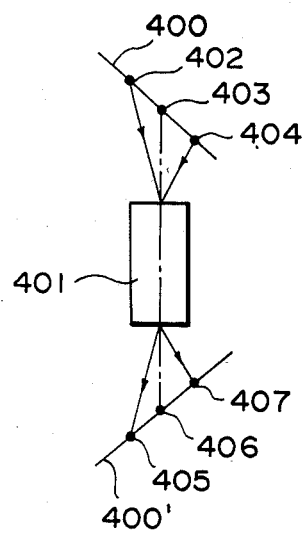
FIG. 4 schematically illustrates the color image reading method of the present invention.
Figure 5:
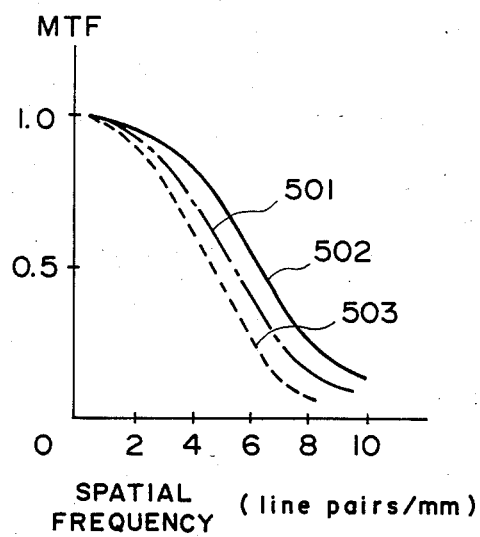
FIG. 5 shows the MTF for the spatial frequency of an original according to the reading method of the present invention.

Referring to FIG. 4, it is schematic view illustrating the color image reading method of the present invention. Designated by 401 is a light-converging fiber array similar to the aforementioned light-converging fiber array 101. An original surface 400 and the image plane 400' are disposed with an angle of about 90° therebetween, the distance between the major scanning line 402 of the original and the image 405 thereof is 20 mm, the distance between the major scanning line 403 of the original and the image 406 thereof is 18 mm, and the distance between the major scanning line 404 of the original and the image 407 thereof is 16 mm. The then MTFs are shown in FIG. 5. In FIG. 5, reference numeral 501 designates the MTF in red light (central wavelength $\lambda = 0.620$ $\mu$m) of the major scanning line 402 and the image 405 thereof, reference numeral 502 denotes the MTF in green light (central wavelength $\lambda = 0.535$ $\mu$m) of the major scanning line 403 and the image 406 thereof, and reference numeral 503 designates the MTF in blue light (central wavelength $\lambda = 0.445$ $\mu$m) of the major scanning line 404 and the image 407 thereof. As seen in FIG. 5, a good result has been obtained in any of these cases. According to the present invention, on the basis of such results, the picture elements of an image sensor are disposed at the respective imaging positions of an imaging optical system for lights of different wavelength ranges to thereby obtain a high resolution.

Figure 6A:
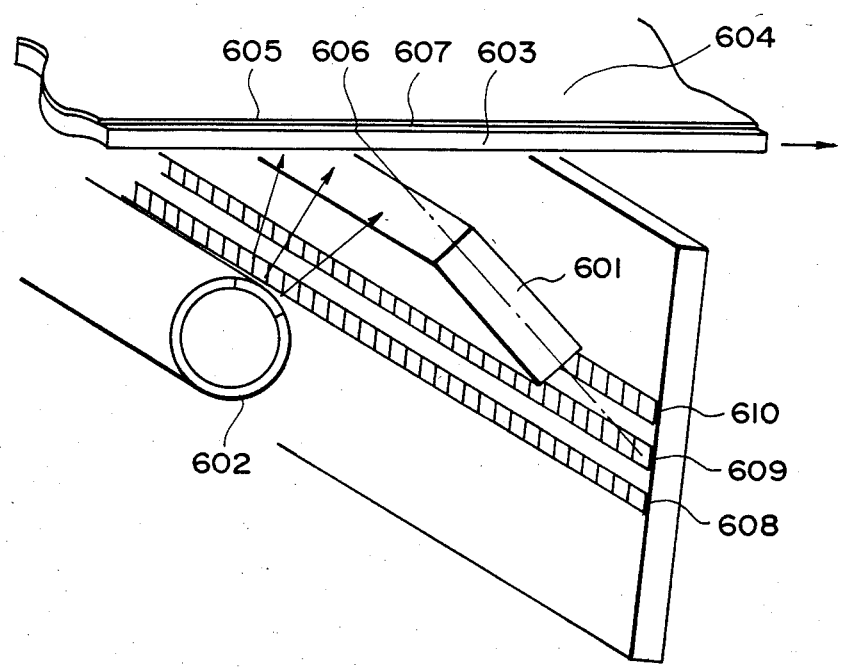
FIG. 6A is a perspective view showing a first embodiment of the color image reading apparatus of the present invention which uses a selfoc lens array as an imaging optical system.
Figure 6B:
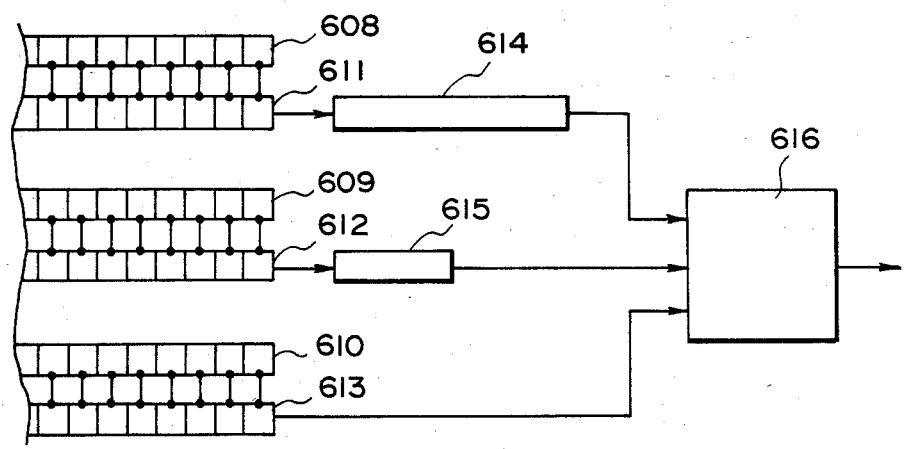
FIG. 6B is a block diagram of the reading unit in the first embodiment.

FIGS. 6A and 6B show a first embodiment of the color image reading apparatus in accordance with the present invention, FIG. 6A being a perspective view and FIG. 6B being a block diagram of the reading unit.

In FIG. 6A, a light-converging fiber array 601 causes the image of an original 604 on an original carriage glass 603 illuminated by an illuminating lamp 602 to be formed on the picture element rows 608, 609 and 610 of CCD (charge coupled device). The picture element row 608 has sensitivity to red light, the picture element row 609 has sensitivity to green light and the picture element row 610 has sensitivity to blue light. Such picture element rows are formed by providing in the optical path color filters transmitting lights of respective wavelengths therethrough.

The original 604 is moved with the original carriage glass 603 in the direction of arrow and, when a particular portion of the original 604 comes to the position of the major scanning line 605, the image thereof is read by the picture element row 608 and the intensity of the red component of the reflected light from this portion is measured. Subsequently, when this portion comes to the position of the major scanning line 606, the image thereof is read by the picture element row 609 and the intensity of the green component of the reflected light from this portion is measured. Further, when this portion comes to the position of the major scanning line 607, the image thereof is read by the picture element row 610 and the intensity of the blue component of the reflected light from this portion is measured.

In FIG. 6B, reference numerals 608, 609 and 610 designate the picture element rows of CCD common to those of FIG. 6A, and reference numerals 611, 612 and 613 denote time-serial signal converting units for making into time-serial signals the image information input from the respective picture element rows. The image information of the red component measured by the picture element row 608 as described above is made into a time-serial signal by the time-serial signal converting unit 611 and accumulated in a line memory 614. The information of the red component is operated as color information by an operational circuit 616 and put out therefrom in synchronism with the image information of the green component measured by the picture element row 609 and accumulated in the line memory through the time-serial signal converting unit 612 and the image information of the blue component measured by the picture element row 610 and converted into a time-serial signal by the time-serial signal converting unit 613.

The color image reading apparatus constructed in this manner has exhibited a characteristic substantially similar to FIG. 5 and has obtained a good resolution.

Figure 7:
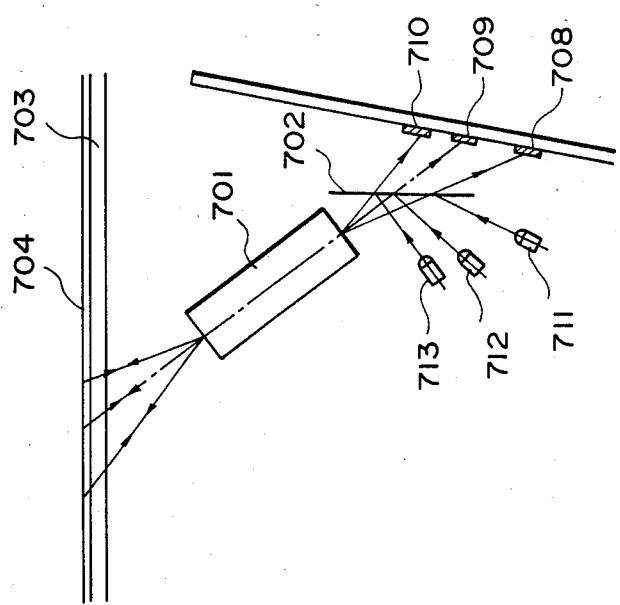
FIG. 7 schematically shows a second embodiment of the present invention which uses a light-emitting diode array as an illuminating light source.

FIG. 7 shows a second embodiment in which a laser diode is used as the original illuminating light source in the aforedescribed first embodiment. In this embodiment, the lights of respective wavelength ranges emitted by a blue light emitting diode array (hereinafter referred to as LDA) 713, a green light LDA 712 and a red light LDA 711 are directed through a half-mirror 702 and a light-converging fiber array 701 to illuminate an original 704 on an original carriage glass 703. The images of the original 704 corresponding to respective wavelength lights are formed on a picture element row 710 having sensitivity to blue light, a picture element row 709 having sensitivity to green light and a picture element row 708 having sensitivity to red light, by the high-converging fiber array 701, and thus a color image can be read in the same manner as in the first embodiment. In this embodiment, the original is illuminated by wavelength lights corresponding to the sensitivities of the respective picture element rows and therefore, the original can be illuminated efficiently and the energy required for the illumination can be reduced. Also, the fact that the image sensor, the LDAs, the light-converging fiber array, etc. are compactly arranged is advantageous in making the reading apparatus compact and light in weight.

Figure 8:
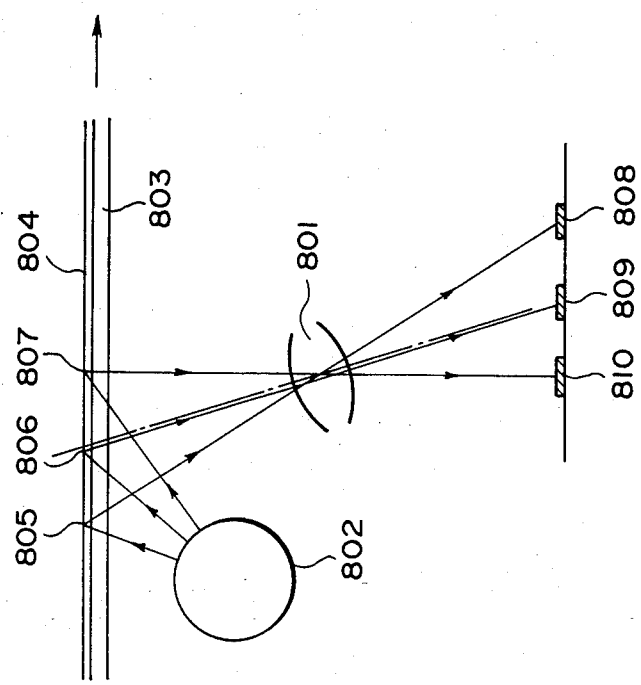
FIG. 8 schematically shows a third embodiment of the present invention using in an optical system a single lens which is not corrected in chromatic aberration.

FIG. 8 schematically shows a third embodiment in which the present invention is applied to an imaging lens which is not corrected in chromatic aberration as an imaging optical system. The imaging lens 801 causes the image of an original 804 on an original carriage glass 803 illuminated by an illuminating lamp 802 to be formed on picture element rows 808, 809 and 810. The picture element row 808 has sensitivity to red light, the picture element row 809 has sensitivity to green light and the picture element row 810 has sensitivity to blue light. The original carriage glass 803 is moved in the direction of arrow and, when a particular portion of the original 804 comes to the position of a major scanning line 805, the image thereof is read by the picture element row 808 and the intensity of the red component of the reflected light from this portion is measured. Thereafter, as in the first embodiment, the intensity of the green component is measured at the position of a major scanning line 806 by the picture element row 809, and the intensity of the blue component is measured at the position of a major scanning line 807 by the picture element row 810 and thus, a color image is read.

Figure 9B:
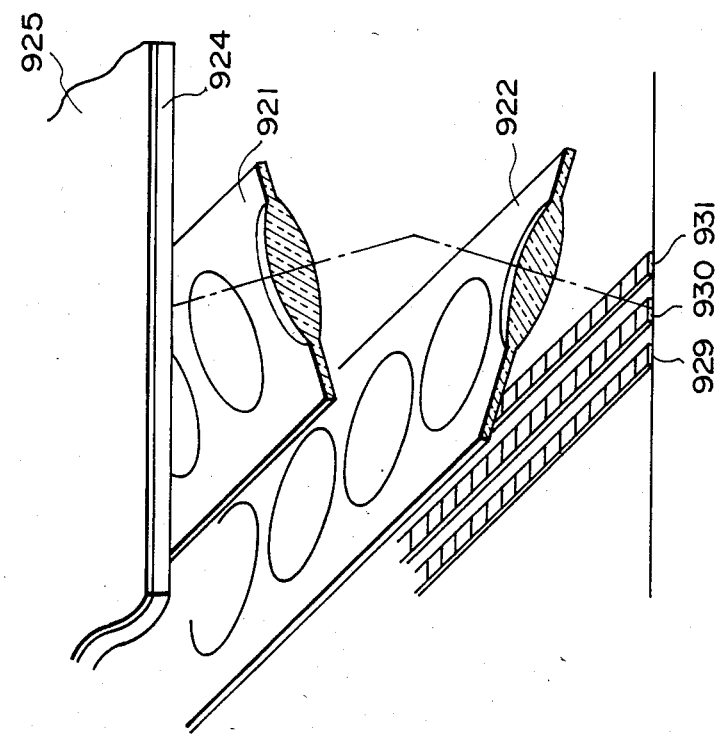
FIG. 9B is a perspective view showing a case where a lens array is used in the fourth embodiment.
Figure 9A:
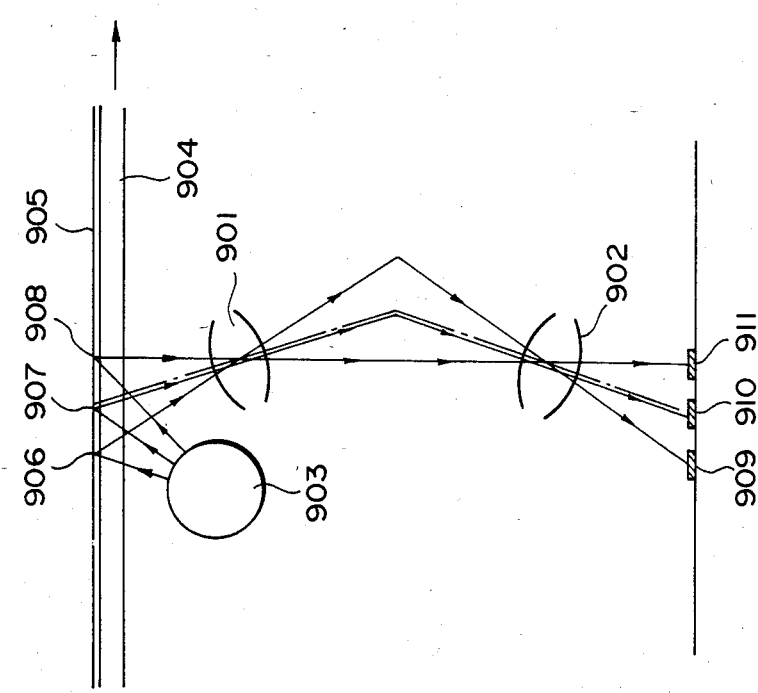
FIG. 9A schematically shows a fourth embodiment of the present invention in which an erect one-to-one magnification imaging system is constituted by the use of two identical lenses which are not corrected in chromatic aberration.

FIG. 9A schematically shows a fourth embodiment in which an erect one-to-one magnification imaging system constructed by using two identical imaging lenses which are not corrected in chromatic aberration is applied to the present invention. In this image, the image of an original 905 on an original carriage glass 904 illuminated by an illuminating lamp 903 is formed on picture element rows 909, 910 and 911 by identical lenses 901 and 902. The picture element row 909 has sensitivity to red light, the picture element row 910 has sensitivity to green light and the picture element row 911 has sensitivity to blue light. The original carriage glass 904 is moved in the direction of arrow and, when a particular portion of the original 905 comes to the position of a major scanning line 906, the image thereof is read by the picture element row 909 and the intensity of the red component of the reflected light from this portion is measured. Subsequently, the intensity of the green component is measured at the position of a major scanning line 907 by the picture element row 910, and the intensity of the blue component is measured at the position of a major scanning line 908 by the picture element row 911, and color image information signals are obtained by a process similar to that in the first embodiment.

Also, in the present embodiment, an erect one-to-one magnification imaging system is constructed as a whole and therefore, the imaging lens can be constituted by a lens array. Such example is shown in FIG. 9B.

In FIG. 9B, reference numerals 921 and 922 designate identical lens arrays, reference numeral 924 denotes an original carriage glass, reference numeral 925 designates an original, and reference numerals 929, 930 and 931 denote the picture element rows of CCD. According to the present example, the optical system is compactly constituted by the lens arrays and a compact, light-weight color image reading apparatus is realized.

The present invention is not restricted to the above-described embodiments, but color image reading apparatuses of various constructions can be realized on the basis of the present invention. For example, in the previously described embodiments, the minor scanning is accomplished by movement of the original carriage, but of course it can also be accomplished by movement of the optical system and image pickup means. The image pickup means is not restricted to the CCD of the embodiments, but may be, for example, a self-scanning type photodiode array or the like. Such color image reading apparatuses are all covered by the present invention as far as they do not depart from the scope of the invention as defined in the appended claims.

What is claimed is:

1. A color image reading apparatus comprising:
   illuminating means for illuminating an object on a plurality of major scanning lines;
   an imaging optical system for forming images of the object on the major scanning lines;
   a plurality of image sensors for respectively sensing light in different wavelength ranges of the images of the object on the major scanning lines, said sensors extending in the direction of the major scanning line at different positions with respect to a minor scanning direction substantially orthogonal to the major scanning direction and being disposed at respective imaging positions of said imaging optical system with respect to the respective sensing wavelength ranges which imaging positions are spaced apart from each other in the direction of the optical axis of said imaging optical system; and
   means for moving, in the minor scanning direction, the position of the object to be sensed by said image sensors relatively to said image sensors.

2. A color image reading apparatus according to claim 1, wherein said illuminating means comprises a plurality of light-emitting diodes for illuminating the object by light of wavelength ranges respectively corresponding to the sensing wavelength ranges of said image sensors.

3. A color image reading apparatus according to claim 1, wherein said imaging optical system comprises a light-converging fiber array arranged in the major scanning direction.

4. A color image reading apparatus according to claim 1, wherein said image sensors are disposed on a plane non-parallel to the plane of the object and the optical axis of said imaging optical system is inclined a predetermined angle with respect to a normal of the plane of the object.

5. A color image reading apparatus according to claim 1, wherein said imaging optical system further comprises a lens array arranged in the major scanning direction.

* * * * *

UNITED STATES PATENT AND TRADEMARK OFFICE
CERTIFICATE OF CORRECTION

PATENT NO. : 4,558,357
DATED : December 10, 1985
INVENTOR(S) : KATSUMI NAKAGAWA, ET AL.

It is certified that error appears in the above-identified patent and that said Letters Patent is hereby corrected as shown below:

Col. 5, line 10, change "In this image," to --In this embodiment--.

Signed and Sealed this

Fourth Day of November, 1986

[SEAL]

Attest:

DONALD J. QUIGG

*Attesting Officer*   *Commissioner of Patents and Trademarks*